US012712408B2

(12) United States Patent
Wolgemuth

(10) Patent No.: US 12,712,408 B2
(45) Date of Patent: Aug. 18, 2026

(54) HERMETIC MOTOR COOLING SYSTEM

(71) Applicant: Johnson Controls Tyco IP Holdings LLP, Milwaukee, WI (US)

(72) Inventor: Tyler Alexander Wolgemuth, Mount Wolf, PA (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 986 days.

(21) Appl. No.: 17/605,195

(22) PCT Filed: Apr. 23, 2020

(86) PCT No.: PCT/US2020/029669
§ 371 (c)(1),
(2) Date: Oct. 20, 2021

(87) PCT Pub. No.: WO2020/219781
PCT Pub. Date: Oct. 29, 2020

(65) Prior Publication Data

US 2022/0239183 A1 Jul. 28, 2022

Related U.S. Application Data

(60) Provisional application No. 62/838,147, filed on Apr. 24, 2019.

(51) Int. Cl.
*H02K 5/20* (2006.01)
*H02K 9/20* (2006.01)

(52) U.S. Cl.
CPC ............... *H02K 5/203* (2021.01); *H02K 9/20* (2013.01)

(58) Field of Classification Search
CPC .......... H02K 5/203; H02K 9/20; Y02B 30/70; F25B 31/008; F25B 31/006; F25B 41/34; F25B 41/40; F04D 29/5806; F04D 25/06
See application file for complete search history.

(56) References Cited

U.S. PATENT DOCUMENTS 6,065,297 A 5/2000 Tischer et al.
2005/0151431 A1* 7/2005 Cronin .................. H02K 5/203 310/58

(Continued)

FOREIGN PATENT DOCUMENTS

CN 103780022 A 5/2014
CN 110462992 A 11/2019

(Continued)

OTHER PUBLICATIONS

Japanese Office Action for JP Application No. 2021-563235, dated Dec. 22, 2022, 7 pages.

(Continued)

*Primary Examiner* — Christopher M Koehler
*Assistant Examiner* — Riley Owen Stout
(74) *Attorney, Agent, or Firm* — Fletcher Yoder, P.C.

(57) ABSTRACT

A system for cooling a hermetic motor includes a housing of the hermetic motor that is configured to be disposed along a motor cooling refrigerant flow path. The housing is configured to surround at least a portion of a stator of the hermetic motor and includes an annular cavity configured to receive refrigerant from a refrigerant loop. The system also includes a sleeve configured to be positioned between the annular cavity and the stator, where the sleeve includes a plurality of discharge ports oriented generally parallel to a central axis of the stator. The plurality of discharge ports is configured to discharge the refrigerant from the annular cavity toward the stator.

20 Claims, 5 Drawing Sheets

(56) References Cited

U.S. PATENT DOCUMENTS

| | | | | |
|---|---|---|---|---|
| 2011/0156509 | A1* | 6/2011 | Minemura | H02K 9/19 310/54 |
| 2015/0180303 | A1 | 6/2015 | Silva | |
| 2015/0226467 | A1 | 8/2015 | Sommer et al. | |
| 2016/0003510 | A1* | 1/2016 | De Larminat | F25B 43/02 62/470 |
| 2020/0204044 | A1* | 6/2020 | Lee | H02K 1/20 |

FOREIGN PATENT DOCUMENTS

| | | | |
|---|---|---|---|
| JP | H0410565 | U | 1/1992 |
| JP | 2003274607 | A | 9/2003 |
| JP | 2015509696 | A | 3/2015 |
| JP | 2016176360 | A | 10/2016 |
| JP | 2018135834 | A | 8/2018 |
| KR | 20140052017 | A | 5/2014 |
| WO | 2019075105 | A1 | 4/2019 |

OTHER PUBLICATIONS

PCT International Search Report and Written Opinion for PCT Application No. PCT/US2020/029669 mailed Aug. 19, 2020, 13 pgs.

Korean Office Action for KR Application No. 10-2021-7038160, dated Jan. 23, 2024, 7 pages.

Chinese Office Action for CN Application No. 202080044084.2, dated Jun. 21, 2024, 8 pages.

* cited by examiner 68, 130
131
132
128
81
98
91
3
80
70
66
64
62
4
102
60
14
120
68
140
30
CONTROLLER
18
CONDENSER
74
72
78
86
82
84
24
76
142
96
100

CONTROLLER
CONDENSER

HERMETIC MOTOR COOLING SYSTEM

CROSS-REFERENCE TO RELATED APPLICATION

This application is a U.S. National Stage Application of PCT International Application No. PCT/US2020/029669, entitled "HERMETIC MOTOR COOLING SYSTEM," filed Apr. 23, 2020, which claims priority to and the benefit of U.S. Provisional Application Ser. No. 62/838,147, entitled "HERMETIC MOTOR COOLING SYSTEM," filed Apr. 24, 2019, each of which is hereby incorporated by reference in its entirety for all purposes.

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A compressor of a refrigeration cycle is driven by a shaft which may be rotated by an electric motor. Heat (e.g., thermal energy) may be generated as electrical current passes through a series of windings forming a stator, which drive rotation of a rotor coupled to the shaft. The rotor and stator are contained within a motor housing that may experience an increase in temperature as heat is generated during operation of the motor. In some compressors, the rotor may be supported by electromagnetic bearings, which may also generate heat and further increase the temperature within the motor housing. Accordingly, cooling fluid may be provided to the motor via a cooling system to remove heat and avoid a decrease in performance or shut-down of the motor caused by overheating. Unfortunately, some cooling systems for motors of a refrigeration cycle may experience reduced cooling fluid flow to portions of the stator when a low pressure refrigerant is utilized in the refrigeration cycle. As such, the operational limits of existing motor cooling systems may generate large temperature gradients (e.g., hot spots) along the stator, thereby affecting the total operating range of the compressor and/or the refrigeration system.

BRIEF SUMMARY

In one embodiment, a system for cooling a hermetic motor includes a housing of the hermetic motor that is configured to be disposed along a motor cooling refrigerant flow path. The housing is configured to surround at least a portion of a stator of the hermetic motor and includes an annular cavity configured to receive refrigerant from a refrigerant loop. The system also includes a sleeve configured to be positioned between the annular cavity and the stator, where the sleeve includes a plurality of discharge ports oriented generally parallel to a central axis of the stator. The plurality of discharge ports is configured to discharge the refrigerant from the annular cavity toward the stator.

In one embodiment, a method includes directing, via a compressor, a refrigerant flow along a refrigerant loop, where the compressor is driven by a hermetic motor. The method includes diverting a portion of the refrigerant flow from the refrigerant loop into an annular cavity formed within a housing of the hermetic motor, where the housing surrounds at least a portion of a stator of the hermetic motor, and where a sleeve is positioned radially between the annular cavity and the stator. The method further includes directing, via a plurality of discharge ports formed in the sleeve, an amount of the portion of the refrigerant flow from the annular cavity toward the stator, where the plurality of discharge ports is oriented generally parallel to a central axis of the stator.

In one embodiment, a hermetic motor includes a housing disposed about a stator of the hermitic motor. The housing includes an annular cavity formed therein, where the annular cavity is configured to receive a refrigerant from a refrigerant loop. The hermetic motor also includes a sleeve positioned between the annular cavity and the stator, where the sleeve includes a plurality of discharge ports oriented generally parallel to a central axis of the stator. The plurality of discharge ports is configured to receive the refrigerant from the annular cavity and to discharge the refrigerant toward the stator.

DRAWINGS

DETAILED DESCRIPTION

Figure 1:
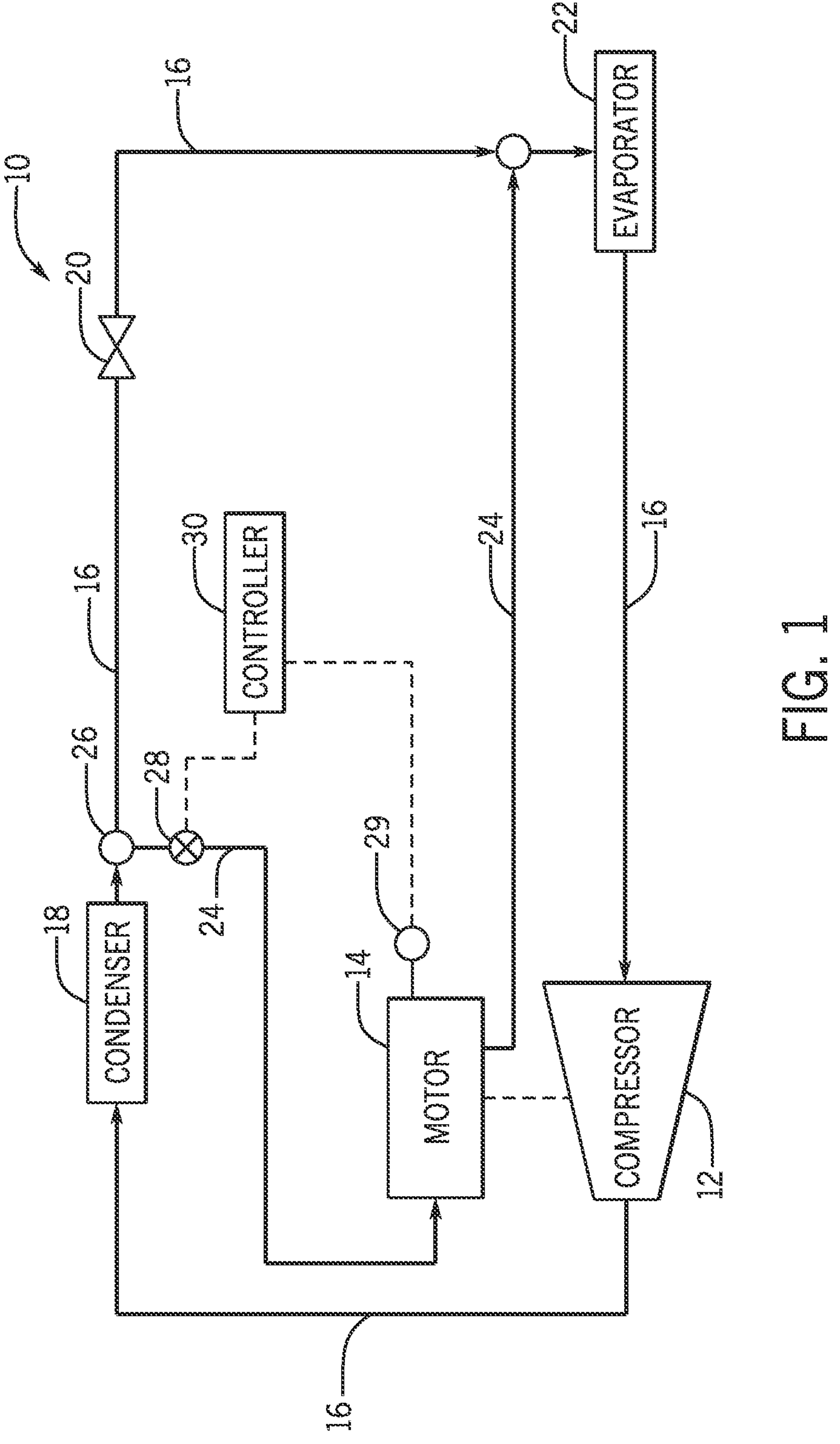
FIG. 1 is a schematic of an embodiment of a heating, ventilation, air conditioning, and/or refrigeration (HVAC&R) system having a hermetic motor that may utilize an improved cooling system, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Motors (e.g., hermetic motors) may be utilized to drive a compressor of a heating, ventilating, air conditioning, and/or refrigeration (HVAC&R) system. Motors produce heat during operation as a result of winding resistance and eddy current losses from the electrical current that is supplied to the motor. The heat produced by the motor transfers thermal energy to a motor housing, thereby increasing a temperature of the motor. Accordingly, at least a portion of a cooling system may be included in the motor housing to absorb the thermal energy and reduce the temperature of the motor (e.g., cool the motor). In some embodiments, the cooling system circulates refrigerant from a refrigerant loop of the HVAC&R system into the motor housing to absorb the thermal energy in the motor housing. For example, refrigerant (e.g., the cooling fluid of the cooling system) is directed from a condenser of the HVAC&R system and into the motor housing to absorb thermal energy generated during operation of the motor. The refrigerant may then be directed back to the refrigerant loop of the HVAC&R system from the motor.

In some cases, the refrigerant entering the motor cooling system from the condenser may have a relatively low pressure. As used herein, low pressure refrigerants may include refrigerants that have a normal boiling point of about 19 degrees Celsius (66 degrees Fahrenheit) at one atmosphere of pressure. As used herein, "normal boiling point" may refer to a boiling point temperature measured at one atmosphere of pressure. As a result, the motor cooling system may inadequately direct refrigerant toward certain motor components within the motor housing, such as a stator of the motor. Indeed, utilizing low pressure refrigerant within the motor cooling system may cause inadequate refrigerant flow toward, for example, end windings of the stator, thereby generating large temperature gradients along a length of the stator. Therefore, typical motor cooling systems may not provide sufficient thermal energy transfer for refrigerant systems that use a low pressure refrigerant.

The present disclosure is directed to an improved motor cooling system that is configured to facilitate more even distribution of refrigerant along the stator, such that a low pressure refrigerant may effectively be utilized in an HVAC&R system and particularly for motor cooling. Accordingly, the improved motor cooling system may increase an amount of thermal energy transfer between the refrigerant and the motor components within the motor housing, thereby enhancing an operational life and/or an operational efficiency of the motor.

For example, in some embodiments, the improved motor cooling system includes a sleeve that is positioned between the stator and the motor housing. An annular cavity may be formed within the motor housing and may be positioned between the sleeve and an interior surface of the motor housing. The annular cavity is configured to receive a refrigerant flow from the HVAC&R system and is in fluid communication with a plurality of discharge ports (e.g., axial discharge ports) that are formed within the sleeve. During operation, the refrigerant is discharged from the annular cavity via the discharge ports, thereby enabling the refrigerant to directly contact at least a portion of the stator to absorb thermal energy from the stator. Indeed, the discharge ports of the motor cooling system may be configured to direct the refrigerant toward particular portions of the stator (e.g., toward end windings of the stator) to facilitate generation of a more even temperature distribution across the stator. Accordingly, the motor cooling system may mitigate or substantially eliminate temperature spikes (e.g., hot spots) at, for example, the end windings of the stator. As such, embodiments of the motor cooling system disclosed herein may improve efficiency of the motor and increase the operating range of the compressor and/or the refrigeration system.

To help illustrate the manner in which the present embodiments may be used in a system, FIG. 1 is a schematic representation of a heating, ventilating, air conditioning, and/or refrigeration (HVAC&R) system 10 that includes a compressor 12 driven by a motor 14 (e.g., a hermetic motor, an electric motor, a hydraulic motor, a pneumatic motor, etc.). As shown in the illustrated embodiment of FIG. 1, the compressor 12 is disposed along a refrigerant loop 16, and the compressor 12 is configured to circulate refrigerant within the refrigerant loop 16. Refrigerant exiting the compressor 12 is received by a condenser 18. In some embodiments, the condenser 18 is an air cooled condenser, such that air is directed over coils of the condenser 18 to absorb thermal energy (e.g., heat) from the refrigerant flowing through the coils. In other embodiments, the condenser 18 may be a shell and tube heat exchanger that places the refrigerant in a heat exchange relationship with a cooling fluid (e.g., water). In any case, the refrigerant transfers thermal energy to a working fluid of the condenser 18 (e.g., air, water, or another suitable cooling fluid), thereby reducing a temperature of the refrigerant exiting the condenser 18.

The refrigerant exiting the condenser 18 may continue along the refrigerant loop 16 toward an expansion device 20. The expansion device 20 is configured to reduce a pressure of the refrigerant, which also further reduces a temperature of the refrigerant. The refrigerant then enters an evaporator 22 disposed along the refrigerant loop 16. The refrigerant flowing through the evaporator 22 absorbs thermal energy (e.g., heat) from a working fluid (e.g., water and/or air). In some embodiments, the evaporator 22 is a shell and tube heat exchanger that places the refrigerant in a heat exchange relationship with a cooling fluid (e.g., water). In other embodiments, the evaporator 22 places the refrigerant in a heat exchange relationship with air. The working fluid of the evaporator 22 (e.g., water, air, or another suitable fluid) may be configured to cool a load, such as a building, a room, a house, or another conditioned space. The refrigerant exiting the evaporator 22 then completes the refrigerant loop 16 by re-entering the compressor 12.

As shown in the illustrated embodiment of FIG. 1, a portion of the refrigerant exiting the condenser 18 may be diverted to a motor cooling loop 24 via a tee 26 (e.g., a first tee and/or a first three-way valve). A valve 28 (e.g., a ball valve, a butterfly valve, a gate valve, a globe valve, a diaphragm valve, and/or another suitable valve) may be disposed along the motor cooling loop 24 downstream of the tee 26 with respect to the flow of the refrigerant through the motor cooling loop 24. The valve 28 may be configured to adjust an amount of the refrigerant that is diverted into the motor cooling loop 24 from the refrigerant loop 16. In some embodiments, the valve 28 is coupled to a controller 30, which is configured to adjust a position of the valve 28 to control a flow of the refrigerant through the motor cooling loop 24 based on a temperature of the motor 14 monitored by a sensor 29 (e.g., a temperature sensor, such as an infrared camera, resistance temperature detector, and/or thermocouple), for example. The refrigerant flowing through the motor cooling loop 24 is directed into a housing (see, e.g., FIG. 2) of the motor 14 to place the refrigerant in a heat exchange relationship with a component (e.g., a stator, a rotor, and/or bearings) of the motor 14. Accordingly, the refrigerant absorbs thermal energy (e.g., heat) from the motor 14 to reduce a temperature of the motor 14. The refrigerant is then directed from the motor 14 back toward the refrigerant loop 16, where the refrigerant flows into the evaporator 22. It should be appreciated that, in some embodiments, the motor cooling loop 24 may include a flow generating device, such as a pump, an eductor, a compressor, or another suitable device that facilitates forcing the refrigerant through the motor cooling loop 24.

Figure 2:
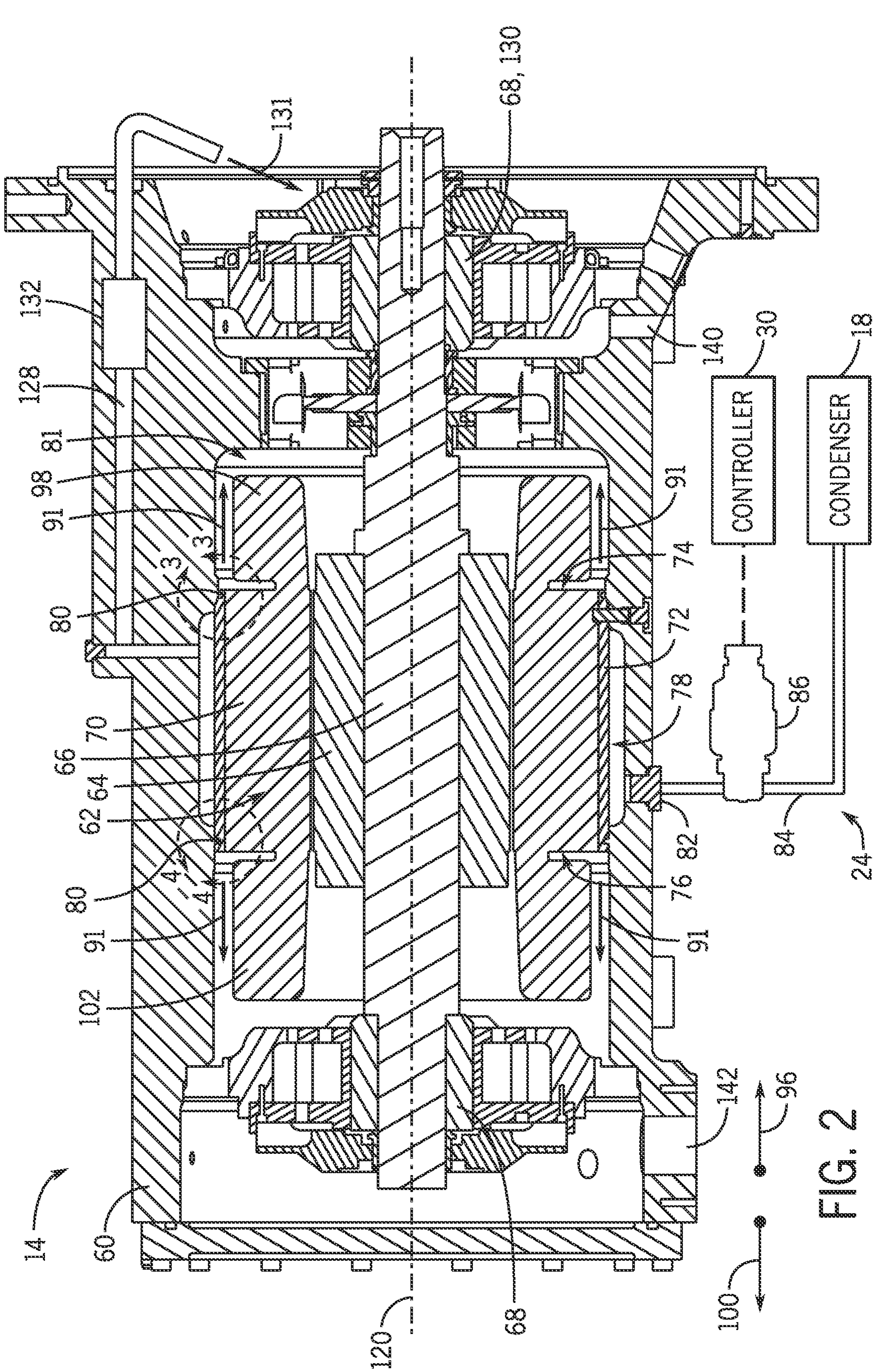
FIG. 2 is a cross-sectional side view of an embodiment of a hermetic motor that includes an improved cooling system, in accordance with an aspect of the present disclosure.
Figure 3:
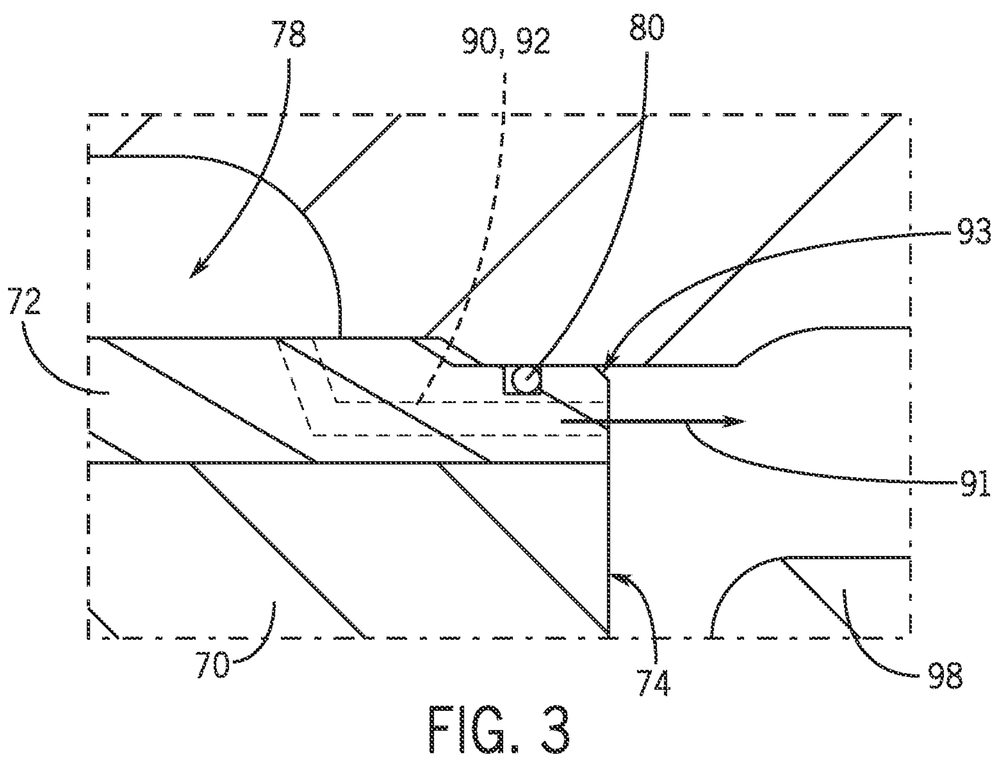
FIG. 3 is a partial cross-sectional side view, taken within line 3-3 of FIG. 2, of an embodiment of a hermetic motor that includes an improved cooling system, in accordance with an aspect of the present disclosure.
Figure 4:
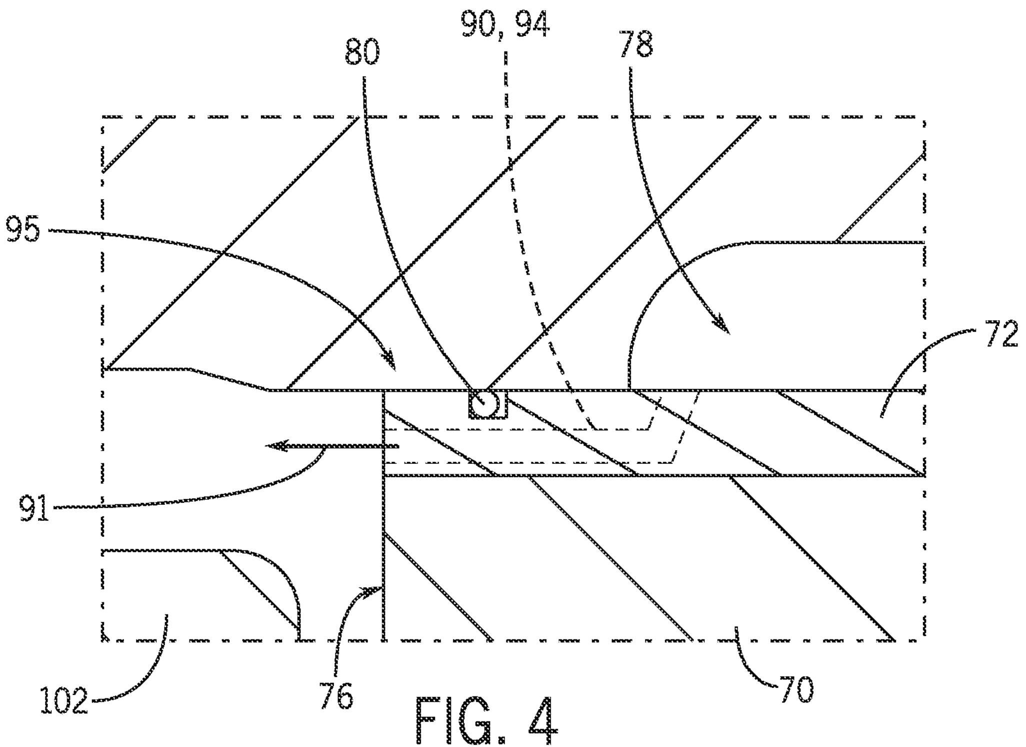
FIG. 4 is a partial cross-sectional side view, taken within line 4-4 of FIG. 2, of an embodiment of a hermetic motor that includes an improved cooling system, in accordance with an aspect of the present disclosure.

FIG. 2 is a cross-sectional side view of an embodiment of the motor 14 that illustrates a flow path of the refrigerant in the motor cooling loop 24 through the motor 14. FIG. 3 is a partial cross-sectional side view, taken within line 3-3 of FIG. 2, of an embodiment of the motor 14, and FIG. 4 is a partial cross-sectional side view, taken within line 4-4 of FIG. 2, of an embodiment of the motor 14. FIGS. 2-4 are discussed concurrently below. As shown in the illustrated embodiment of FIG. 2, the motor 14 includes a housing 60, as well as a stator 62, a rotor 64 coupled to a shaft 66, and bearings 68 (e.g., ball bearings, sleeve bearings, magnetic bearings, or other suitable bearings) disposed within the housing 60. A central portion 70 of the stator 62 may be surrounded by a sleeve 72 that is positioned between the stator 62 and the housing 60. Particularly, the sleeve 72 may extend along a length of the central portion 70 from a first end face 74 of the central portion 70 to a second end face 76 of the central portion 70. The motor 14 may include an annular cavity 78 that is formed within the housing 60 and extends radially between an inner surface of the housing 60 and the sleeve 72. In some embodiments, one or more seals 80 (e.g., O-rings, gaskets) may be positioned within respective grooves formed within the sleeve 72 and are configured to form a fluid seal between the annular cavity 78 and an interior region 81 of the housing 60. However, it should be noted that, in other embodiments, the seals 80 may be omitted from the sleeve 72. Indeed, in such embodiments, the sleeve 72 itself may be configured to abut (e.g., via a compression fit) the interior surface of the housing 60 to substantially block fluid flow from the annular cavity 78 to the interior region 81 via an interface between the sleeve 72 and the housing 60.

In any case, as shown in the illustrated embodiment, the housing 60 includes an inlet port 82 that enables the motor cooling loop 24 to direct a flow of refrigerant into the annular cavity 78. That is, the annular cavity 78 may be in fluid communication with the motor cooling loop 24 via an inlet line 84 of the motor cooling loop 24 that is coupled to the inlet port 82. As discussed above, in some embodiments, the refrigerant entering the motor cooling loop 24 may include a portion of the refrigerant discharged from the condenser 18. Indeed, the inlet line 84 may be fluidly coupled to a portion of the condenser 18 or a portion of the refrigerant loop 16 downstream of the condenser 18, such that the inlet line 84 may receive refrigerant in a substantially liquid state (e.g., in a condensed state). In some embodiments, an electronic expansion valve 86 may be coupled to the inlet line 84 and configured to expand the refrigerant from the substantially liquid state into a vapor state or a mixture of liquid and vapor before the refrigerant enters the annular cavity 78 via the inlet port 82. The electronic expansion valve 86 may be communicatively coupled to the controller 30, which may be configured to operate (e.g., control) the electronic expansion valve 86 to control an amount of refrigerant that is expanded into a vapor state. As such, the electronic expansion valve 86 is operable (e.g., via signals provided by the controller 30) to control a phase composition (e.g., a ratio of vaporous refrigerant to liquid refrigerant) of the refrigerant entering the annular cavity 78. Additionally or alternatively, the controller 30 may operate the electronic expansion valve 86 to control, for example, a flow rate of refrigerant entering the annular cavity 78 and/or a pressure of refrigerant within the annular cavity 78.

As shown in FIGS. 3 and 4, the sleeve 72 may include a plurality of ports 90 (e.g., axial discharge ports) or passages that are in fluid communication with the annular cavity 78 and are configured to discharge refrigerant (e.g., represented by arrows 91) from the annular cavity 78 into the interior region 81 of the housing 60. Specifically, the sleeve 72 may include a first group of ports 92 (FIG. 3) that are formed within a first end portion 93 of the sleeve 72, proximate the first end face 74, and a second group of ports 94 (FIG. 4) that are formed within a second end portion 95 of the sleeve 72, proximate the second end face 76. In this manner, the first group of ports 92 may discharge a flow of the refrigerant in a first direction 96, toward and across a first end winding 98 of the stator 62, while the second group of ports 94 may discharge a flow of the refrigerant in a second direction 100, generally opposite to the first direction 96, toward and across a second end winding 102 of the stator 62. Accordingly, the refrigerant may directly contact the first and second end windings 98, 102 and particularly portions of the end windings 98, 102 (e.g., roots and/or distal ends of the end windings 98, 102) that may generate a relatively large amount of thermal energy (e.g., heat) during operation of the motor 14. Accordingly, the refrigerant may absorb thermal energy from the first and second end windings 98, 102 to ensure that a temperature gradient along the first end winding 98, the central portion 70 of the stator 62, and the second end winding 98 is reduced or substantially negligible. It should be appreciated that each of the ports 90 extends through the sleeve 72 such that a respective flow path along each port 90 is enclosed by the sleeve 72.

In some embodiments, the ports 90 may extend generally parallel (e.g., within five degrees) to a central axis 120 of the stator 62. As used herein, the term “parallel” or “generally parallel” refers to a spatial relationship between features or elements that extend in a common direction but are also not necessarily constrained by a mathematical or Euclidean parallel relationship. In other embodiments, the ports 90 may extend at an angle relative to the central axis 120. For example, the first and second groups of ports 92, 94 may extend radially inward from the annular cavity 78 toward the first end winding 98 or the second end winding 102, respectively. In some embodiments, the first and second groups of ports 92, 94 may be configured to discharge respective refrigerant flows at different flow rates. For example, as discussed in detail below, a quantity of the ports 90 and/or a size of the ports 90 may be adjusted to enable the first group of ports 92 to discharge refrigerant from the annular cavity 78 at a first flow rate (e.g., a relatively large flow rate), while the second group of ports 94 may discharge refrigerant from the annular cavity 78 at a second flow rate (e.g., a relatively low flow rate). In this manner, the motor cooling loop 24 may be configured to mitigate or substantially reduce temperature fluctuations (e.g., hot spots) along a length of the stator 62 and/or throughout other motor components (e.g., the rotor 64, the shaft 66) within the housing 60. That is, the size, number, and/or other configuration of the ports 90 may be selected or biased to discharge a greater flow rate of refrigerant toward portions of the stator 62 and/or other motor components within the housing 60 that are expected to undergo greater thermal loading during operation of the motor 14.

In some embodiments, the ports 90 may be configured to discharge substantially all refrigerant entering the annular cavity 78 from the inlet line 84. In certain embodiments, the annular cavity 78 may be in fluid communication with an outlet line 128 that is formed within the housing 60 and is configured to receive at least a portion of the refrigerant from the annular cavity 78. For example, in some embodiments, the outlet line 128 may be fluidly coupled to the evaporator 22, or to another suitable section of the refrigerant loop 16, and may be configured to discharge a portion of the refrigerant back to the evaporator 22. For example, a valve may be used to control a flow rate of refrigerant discharging from the annular cavity 78 to the evaporator 22.

In other embodiments, the outlet line 128 may be configured to direct a refrigerant flow from the annular cavity 78 and toward the bearings 68, thereby enabling the refrigerant to contact the bearings 68 and absorb thermal energy from the bearings 68. As an example, in the illustrated embodiment, the outlet line 128 extends toward and is configured to direct a flow of refrigerant onto an impeller-side bearing 130 of the bearings 68. Indeed, the outlet line 128 may direct an auxiliary refrigerant flow (e.g., represented by arrow 131) onto the impeller-side bearing 130. In certain embodiments, a flow control device 132 (e.g., an additional electronic expansion valve, a step-less control valve) may be coupled to the outlet line 128 and is operable to regulate a flow rate of refrigerant that discharges from the annular cavity 78 via the outlet line 128.

In certain embodiments, the valve 28 (see, e.g., FIG. 1), the electronic expansion valve 86, the flow control device 132, or a combination thereof, may be operable (e.g., via the controller 30) to control a flow rate of refrigerant discharging through the ports 90. In other words, the motor cooling loop 24 may include an active control system that is configured to regulate refrigerant flow through the ports 90 of the motor cooling loop 24. As an example, transitioning the electronic expansion valve 86 toward an open position (e.g., based on inputs from the controller 30) may increase a flow rate of refrigerant entering the annular cavity 78, and thus, may increase a flow rate and/or a discharge pressure of refrigerant that is discharged through the ports 90. Conversely, transitioning the electronic expansion valve 86 toward a closed position (e.g., based on inputs from the controller 30) may decrease a flow rate of refrigerant entering the annular cavity 78, and thus, may decrease a flow rate and/or a discharge pressure of refrigerant that is discharged through the ports 90. It should be noted that, in some embodiments, the valve 28, the electronic expansion valve 86, and/or the flow control device 132 may be omitted from the motor cooling loop 24. In such embodiments, a flow rate of refrigerant discharging via the ports 90 may correspond to a refrigerant pressure within, for example, the condenser 18. That is, in such embodiments, the motor cooling loop 24 includes a passive control system, where refrigerant flow through the motor cooling loop 24 is determined based on refrigerant parameters (e.g., refrigerant pressure) within the condenser 18 or another portion of the refrigerant loop 16.

In any case, the refrigerant discharging from the ports 90 may absorb a significant quantity of thermal energy (e.g., heat) from motor components within the housing 60, such as from the first and second end windings 98, 102 of the stator 62, which may cause the refrigerant to evaporate into a refrigerant vapor or a mixture of refrigerant vapor and liquid refrigerant. Accordingly, the housing 60 may include a drain 140 that enables refrigerant vapor to discharge from the interior region 81 of the housing 60 and flow back toward the refrigerant loop 16 (e.g., via a conduit). Additionally, the housing 60 may also include a vent 142 that enables liquid refrigerant to flow from the interior region 81 back toward the refrigerant loop 16 (e.g., via a conduit). It should be appreciated that, as the refrigerant flows from the sleeve 72 toward the drain 140 and/or the vent 142, the refrigerant may further contact and absorb heat (e.g., thermal energy) from motor components within the housing 60, such as the rotor 64 and/or the bearings 68.

Figure 5:
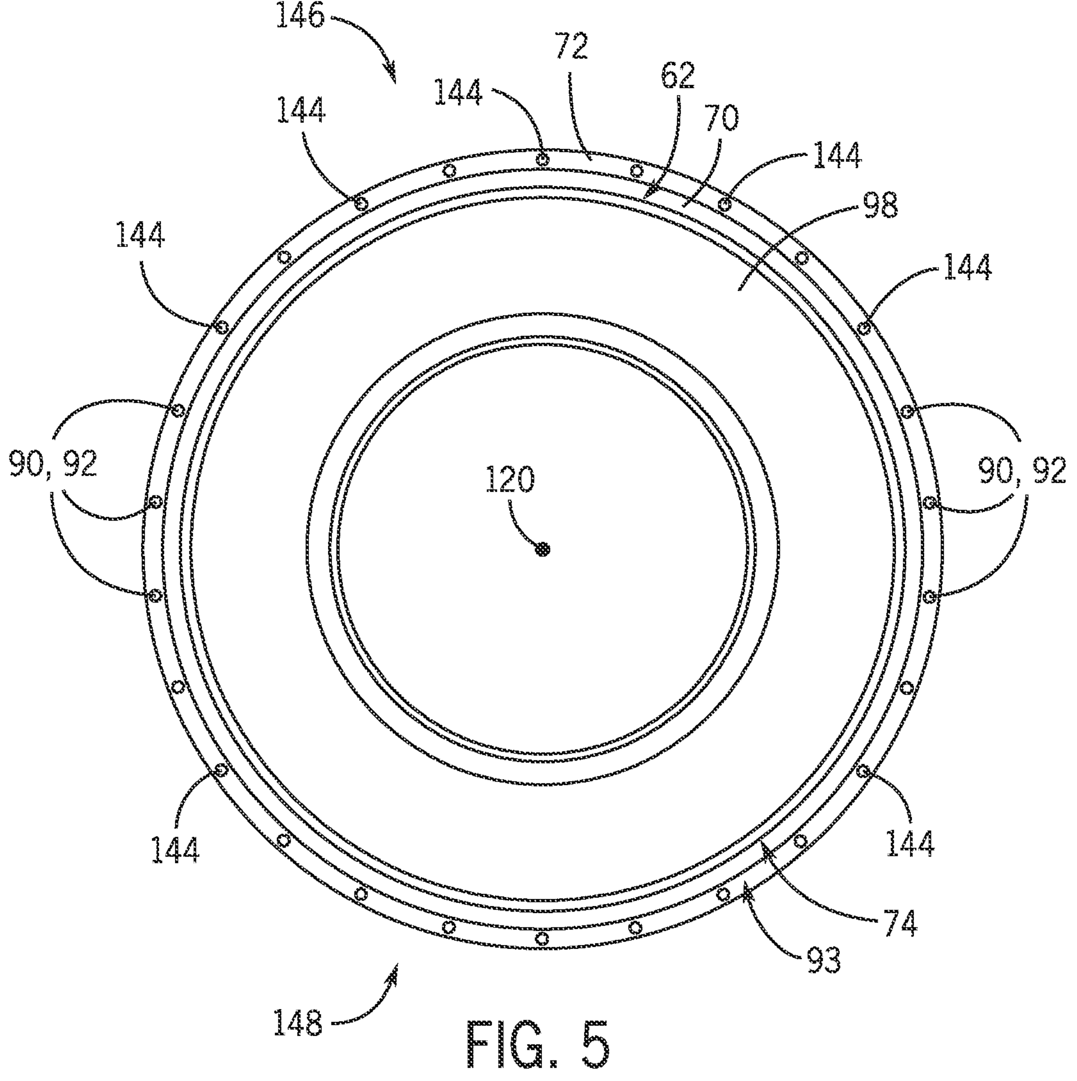
FIG. 5 is a front view of an embodiment of a stator for a hermetic motor, in accordance with an aspect of the present disclosure.

FIG. 5 is a front view of an embodiment of the stator 62 illustrating the first group of ports 92 formed within the sleeve 72. For clarity, it should be noted that the second group of ports 94 may be formed and arranged within the sleeve 72 in a substantially similar manner as the first group of ports 92. However, for conciseness, the first group of ports 92 will be discussed below with reference to FIG. 5. The first group of ports 92 may be arrayed about the central axis 120 of the stator 62 in a symmetrical or uniform arrangement, or an asymmetrical arrangement. In some embodiments, certain of the ports 90 may include plugs 144 that are configured to block refrigerant flow through these ports 90. Accordingly, the sleeve 72 may be biased to discharge refrigerant toward particular portions of the stator 62 that may experience higher thermal loading than other portions of the stator 62 during operation of the motor 14. For example, in some embodiments, empirical trials (e.g., thermal data collection via the sensor 29) or thermal analysis using computational modeling software may be used to determine if or whether a first side portion 146 of the stator 62 experiences less thermal loading than a second side portion 148 of the stator 62, opposite the first side portion 146, during operation of the motor 14. Accordingly, in such embodiments, a greater quantity of plugs 144 may be coupled to ports 90 positioned near the first side portion 146 than a quantity of plugs 144 coupled to ports 90 positioned near the second side portion 148, thereby biasing refrigerant flow toward the second side portion 148 of the stator 62. Indeed, testing or analysis may be conducted to determine any portion of the stator 62 that experiences more or less thermal loading than another portion, and the plugs 144 may be utilized with one or more of the ports 90, as desired. In this manner, the arrangement of ports 90 with the sleeve 72 may be adjusted to achieve a substantially or more even uniform temperature distribution across the stator 62 during operation of the motor 14.

It should be noted that, in other embodiments, instead of using the plugs 144 to bias refrigerant flow discharging from the sleeve 72, a quantity of ports 90 near certain portions of the stator 62 may be increased or decreased. That is, to bias refrigerant flow toward, for example, the second side portion 148 of the stator 62, a quantity of ports 90 positioned or formed near the second side portion 148 may be increased as compared to a quantity of ports 90 positioned or formed near the first side portion 146 of the stator 62. Accordingly, refrigerant may discharge from the sleeve 72 near the second side portion 148 of the stator 62 at a flow rate that is greater than a flow rate of refrigerant discharging near the first side portion 146 of the sleeve 72. Moreover, in certain embodiments, refrigerant flow may be biased toward certain portions of the stator 62 by increasing or decreasing a cross-sectional area of various ports 90 arrayed within the sleeve 72. As an example, to bias refrigerant flow to the second side portion 148 of the stator 62, a cross-sectional area of ports 90 positioned near the second side portion 148 may be increased as compared to a cross-sectional area of ports 90 positioned near the first side portion 146 of the stator 62.

It should be appreciated that, in accordance with these techniques, refrigerant flow may also be biased toward the first end windings 98 or the second end windings 102 of the stator 62, in particular, via adjustments to the aforementioned parameters of the first group of ports 92 and/or the second group of ports 94. For example, to bias refrigerant flow toward the first end windings 98, as compared to a flow rate of refrigerant that may be directed toward the second end windings 102, the sleeve 72 may be manufactured to include a greater quantity of ports 90 in the first group of ports 92 than a quantity of ports 90 included in the second group of ports 94. Additionally or alternatively, the first group of ports 92 may be configured to have a greater cumulative cross-sectional area (e.g., a combined cross-sectional area of the ports 90 in the first group of ports 92) than a cumulative cross-sectional area of the second group of ports 94 (e.g., a combined cross-sectional area of the ports 90 in the second group of ports 94).

Figure 6:
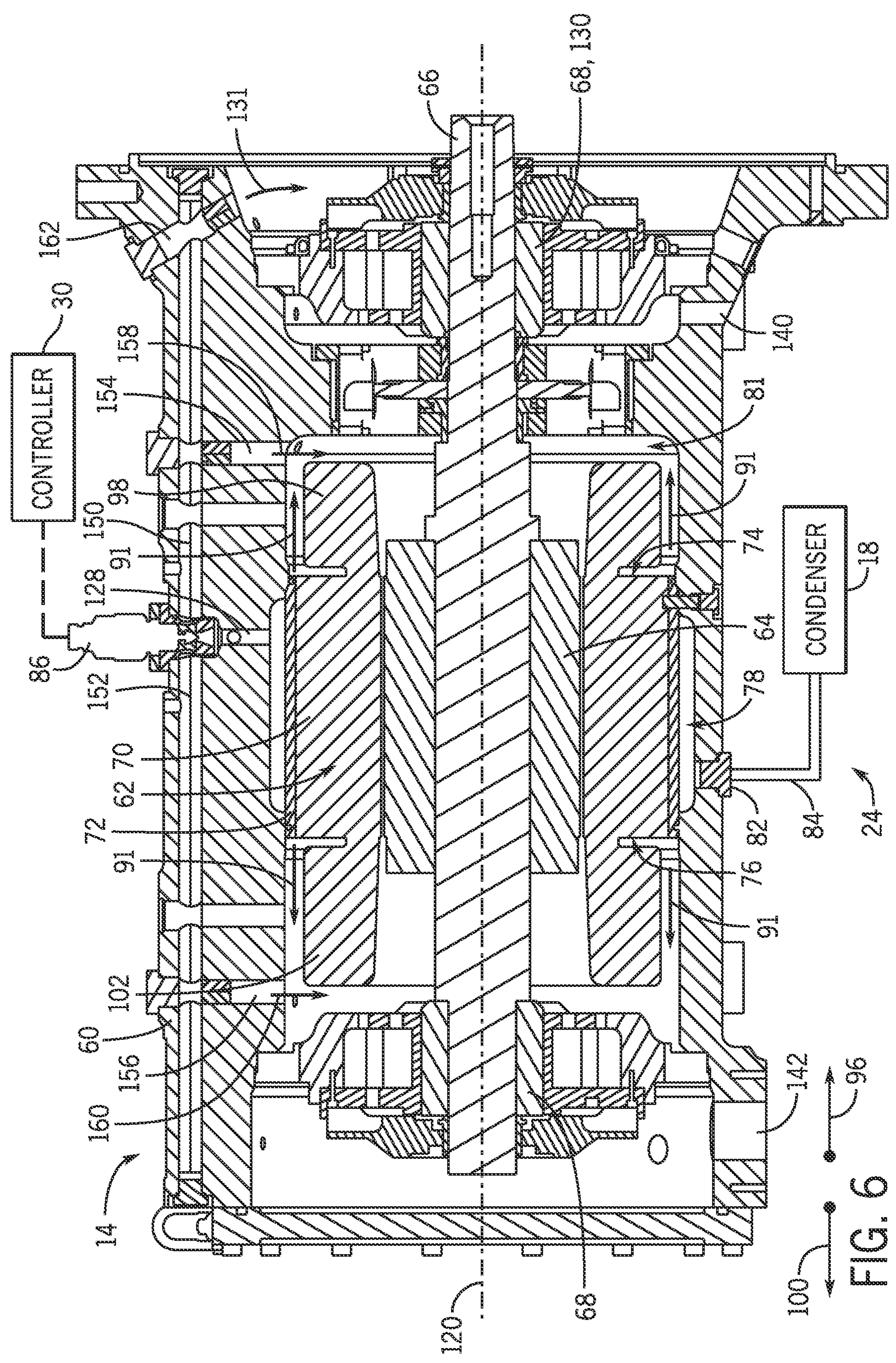
FIG. 6 is a cross-sectional side view of an embodiment of a hermetic motor that includes an improved cooling system, in accordance with an aspect of the present disclosure.

FIG. 6 is a cross-sectional side view of another embodiment of the motor 14 that illustrates a flow path of the refrigerant in the motor cooling loop 24 through the motor 14. In some embodiments, as shown, the electronic expansion valve 86 may be omitted from the inlet line 84 of the motor cooling loop 24, such that the annular cavity 78 may receive a flow of liquid refrigerant or substantially liquid refrigerant from the condenser 18. As such, a pressure of the refrigerant within the annular cavity 78, and thus, a flow rate of refrigerant discharging from the annular cavity 78 via the ports 90, may correspond to the refrigerant pressure within the condenser 18. Accordingly, a relatively high condenser pressure may enable the ports 90 to discharge a relatively large flow rate of refrigerant (e.g., the refrigerant 91), while a relatively low condenser pressure may enable the ports 90 to discharge a relatively low flow rate of refrigerant (e.g., the refrigerant 91). In other words, the motor cooling loop 24 may be passively controlled via control of the condenser 18 pressure. In certain embodiments, the ports 90 may discharge the refrigerant from the annular cavity 78 in a liquid state, such that the refrigerant may flow substantially as a liquid along the first and second end windings 98, 102 of the stator 62. In other embodiments, directing the refrigerant through the ports 90 may cause the refrigerant to vaporize, and thus, enable the ports 90 to discharge refrigerant vapor toward the first and second end windings 98, 102. In further embodiments, the ports 90 may discharge a mixture of liquid refrigerant and refrigerant vapor.

In some embodiments, as shown, the electronic expansion valve 86 may be fluidly coupled to the outlet line 128 instead of the inlet line 84. The electronic expansion valve 86 may be operable (e.g., via the controller 30) to control a flow rate of refrigerant discharging from the annular cavity 78 and flowing into a first axial outlet line 150 and/or a second axial outlet line 152 that are formed within the housing 60. In certain embodiments, the electronic expansion valve 86 may be configured to expand (e.g., vaporize) the refrigerant from the substantially liquid state within the annular cavity 78 into a vapor state, or a mixture of liquid and vapor, before the refrigerant enters the first and second axial outlet lines 150, 152. However, it should be noted that, in other embodiments, the electronic expansion valve 86 may be omitted from the outlet line 128, such that the first and/or second axial outlet lines 150, 152 may receive a refrigerant flow (e.g., a substantially liquid refrigerant flow) directly from the outlet line 128.

In some embodiments, the first axial outlet line 150 and the second axial outlet line 152 may be in fluid communication with a first radial discharge port 154 and a second radial discharge port 156, respectively, which are configured to discharge refrigerant from the first and second axial outlet lines 150, 152 toward the stator 62 or toward another suitable motor component within the housing 60. For example, the first radial discharge port 154 may be configured to direct a first flow of refrigerant (e.g. represented by arrow 158) toward and across the first end winding 98 of the stator 62, and the second radial discharge port 156 may be configured to direct a second flow of refrigerant (e.g., represented by arrow 160) toward and across the second end winding 102 of the stator 62. In certain embodiments, the first axial outlet line 150 may be in fluid communication with a third radial discharge port 162 (e.g., an inlet port angled toward the central axis 120), which may be configured to direct refrigerant (e.g., the auxiliary refrigerant flow 131) toward the impeller-side bearing 130.

Although the motor 14 includes three radial discharge ports (e.g., the radial discharge ports 154, 156, 162) in the illustrated embodiment, in other embodiments, any suitable quantity of radial discharge ports may be formed within the housing 60 and positioned about the central axis 120. As an example, in some embodiments, the motor 14 may include 1, 2, 3, 4, 5, 6, or more than six radial discharge ports formed within the housing 60 that are configured to direct a flow of refrigerant onto or toward various components disposed within the housing 60. Further, it should be noted that, in other embodiments, the first axial outlet line 150, the second axial outlet line 152, or both, may be omitted from the motor cooling loop 24. In such embodiments, refrigerant entering the outlet line 128 may be directed toward back toward the refrigerant loop 16, such as via a conduit coupled to the housing 60, where the refrigerant flows into the evaporator 22. In further embodiments, the outlet line 128 may be omitted from the housing 60, such that all refrigerant entering the annular cavity 78 through the inlet line 84 discharges into the interior region 81 via the ports 90. Additionally or alternatively, the motor 14 may include any one or combination of the motor cooling features discussed above.

As set forth above, embodiments of the present disclosure may provide one or more technical effects useful for mitigating or substantially eliminating temperature gradients along the stator 62 of the motor 14. More specifically, the disclosed motor cooling system is configured to direct refrigerant flow toward particular portions of the stator 62 (e.g., the end windings 98, 102) that typically receive inadequate refrigerant flow when using a low pressure refrigerant within a conventional motor cooling system. Indeed, the improved hermetic motor cooling system discussed herein facilitates a more even distribution of refrigerant across the stator 62, such that a low pressure refrigerant may effectively be utilized in the motor cooling loop 24 of the HVAC&R system 10 to cool the motor 14. In this manner, the improved motor cooling system may increase amount of thermal energy transfer between the refrigerant and motor components (e.g., the stator 62) within the housing 60, thereby enhancing an operational life and/or an operational efficiency of the motor 14.

While only certain features and embodiments of the present disclosure have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed embodiments. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for cooling a hermetic motor, comprising:

a housing of the hermetic motor configured to be disposed along a motor cooling refrigerant flow path, wherein the housing includes an annular cavity configured to receive refrigerant from a refrigerant loop, and wherein the housing is configured to surround at least a portion of a stator of the hermetic motor; and a sleeve configured to be positioned between the annular cavity and the stator, wherein the sleeve includes a plurality of discharge ports, wherein at least one discharge port of the plurality of discharge ports comprises a first portion extending in a direction along a central axis of the stator and a second portion extending from the first portion to the annular cavity, wherein the plurality of discharge ports is configured to discharge the refrigerant from the annular cavity toward the stator.

2. The system of claim 1, wherein the plurality of discharge ports is spaced uniformly about a circumference of the sleeve.

3. The system of claim 1, wherein:

the plurality of discharge ports is spaced asymmetrically about the sleeve, or a first discharge port of the plurality of discharge ports includes a cross-sectional area that is greater than or less than a cross-sectional area of a second discharge port of the plurality of discharge ports.

4. The system of claim 1, wherein the plurality of discharge ports includes a first plurality of discharge ports configured to direct a first refrigerant portion of the refrigerant from the annular cavity toward a first end winding of the stator, and a second plurality of discharge ports configured to direct a second refrigerant portion of the refrigerant from the annular cavity toward a second end winding of the stator.

5. The system of claim 4, wherein a first quantity of the first plurality of discharge ports is greater than or less than a second quantity of the second plurality of discharge ports.

6. The system of claim 4, wherein the first plurality of discharge ports is configured to direct the first refrigerant portion of the refrigerant to directly contact the first end winding, and the second plurality of discharge ports is configured to direct the second refrigerant portion of the refrigerant to directly contact the second end winding.

7. The system of claim 1, comprising the stator, wherein the stator comprises a central portion positioned axially between a pair of end windings of the stator, wherein the sleeve extends from a first end face of the central portion to a second end face of the central portion, wherein the plurality of discharge ports is configured to direct the refrigerant across the pair of end windings of the stator.

8. The system of claim 1, comprising the motor cooling refrigerant flow path, wherein the motor cooling refrigerant flow path is configured to direct the refrigerant from a condenser disposed along the refrigerant loop to the hermetic motor and from the hermetic motor back to the refrigerant loop.

9. The system of claim 8, wherein the motor cooling refrigerant flow path comprises an inlet line fluidly coupling the annular cavity to the refrigerant loop and comprises an electronic expansion valve disposed along the inlet line and configured to control flow parameters of the refrigerant entering the annular cavity via the inlet line.

10. The system of claim 8, wherein the motor cooling refrigerant flow path comprises an outlet line fluidly coupled to the annular cavity and configured to direct an auxiliary refrigerant flow from the annular cavity toward a bearing of the hermetic motor.

11. The system of claim 1, comprising:

an outlet line formed in the housing and in fluid communication with the annular cavity, wherein the outlet line is configured to receive a flow of the refrigerant from the annular cavity; and a radial discharge port formed in the housing and in fluid communication with the outlet line, wherein the radial discharge port is configured to receive the flow of the refrigerant from the outlet line and to direct the flow of the refrigerant onto an end winding of the stator.

12. The system of claim 11, comprising an electronic expansion valve disposed along the outlet line and configured to control a flow rate of the flow of the refrigerant discharged from the annular cavity through the outlet line.

13. A method, comprising:

directing, via a compressor, a refrigerant flow along a refrigerant loop, wherein the compressor is driven by a hermetic motor;

diverting a portion of the refrigerant flow from the refrigerant loop into an annular cavity formed within a housing of the hermetic motor, wherein the housing surrounds at least a portion of a stator of the hermetic motor, and wherein a sleeve is positioned radially between the annular cavity and the stator; and directing, via a plurality of discharge ports formed in the sleeve, an amount of the portion of the refrigerant flow from the annular cavity toward the stator, wherein at least one discharge port of the plurality of discharge ports comprises a first portion extending in a direction along a central axis of the stator and a second portion extending from the first portion to the annular cavity.

14. The method of claim 13, comprising:

directing, via an outlet passage formed in the housing and in fluid communication with the annular cavity, a separate amount of the portion of the refrigerant flow from the annular cavity to a radial discharge port formed within the housing; and directing, via the radial discharge port, the separate amount of the portion of the refrigerant flow toward an end winding of the stator, toward a bearing of the hermetic motor, or both.

15. The method of claim 13, comprising:

controlling, via an expansion valve fluidly coupled to the annular cavity, a flow rate of the portion of the refrigerant flow, a pressure of the portion of the refrigerant flow, a phase composition of the portion of the refrigerant flow, or a combination thereof.

16. A hermetic motor, comprising:

a housing disposed about a stator of the hermitic motor and comprising an annular cavity formed therein and configured to receive a refrigerant from a refrigerant loop; and a sleeve positioned between the annular cavity and the stator, wherein the sleeve comprises a plurality of discharge ports, wherein at least one discharge port of the plurality of discharge ports comprises a first portion extending in a direction along a central axis of the stator and a second portion extending from the first portion to the annular cavity, and wherein the plurality of discharge ports is configured to receive the refrigerant from the annular cavity and to discharge the refrigerant toward the stator.

17. The hermetic motor of claim 16, wherein the plurality of discharge ports comprises a first group of discharge ports configured to direct a first refrigerant portion of the refrigerant from the annular cavity toward a first end winding of the stator and comprises a second group of discharge ports configured to direct a second refrigerant portion of the refrigerant from the annular cavity toward a second end winding of the stator, opposite the first end winding.

18. The hermetic motor of claim 17, wherein a cumulative cross-sectional area of the first group of discharge ports is different than a cumulative cross-sectional area of the second group of discharge ports.

19. The hermetic motor of claim 16, wherein the housing comprises a drain formed therein and configured to direct the refrigerant from an interior of the housing toward an evaporator disposed along the refrigerant loop.

20. The hermetic motor of claim 16, wherein each discharge port of the plurality of discharge ports extends through the sleeve such that a respective flow path defined by each discharge port is enclosed within and by the sleeve.

* * * * *